United States Patent [19]
Fargo et al.

[11] Patent Number: 5,806,500
[45] Date of Patent: Sep. 15, 1998

[54] FUEL VAPOR RECOVERY SYSTEM

[75] Inventors: Gerald Reed Fargo, Canton; Philip Jeffrey Johnson, Ann Arbor; Mark Frederick Jacobson, Clinton, all of Mich.

[73] Assignee: Ford Motor Company, Dearborn, Mich.

[21] Appl. No.: 794,025

[22] Filed: Feb. 3, 1997

[51] Int. Cl.[6] .................................................. F02M 33/02
[52] U.S. Cl. ...................................... 123/520; 123/198 D
[58] Field of Search ..................................... 123/520, 518, 123/519, 516, 521, 198 D

[56] References Cited

U.S. PATENT DOCUMENTS

| | | | |
|---|---|---|---|
| 4,279,233 | 7/1981 | Tobita et al. | |
| 4,817,576 | 4/1989 | Abe et al. | |
| 4,872,439 | 10/1989 | Sonoda et al. | |
| 5,111,795 | 5/1992 | Thompson | |
| 5,337,721 | 8/1994 | Kasuya et al. | |
| 5,456,237 | 10/1995 | Yamazaki et al. | |
| 5,456,238 | 10/1995 | Horiuchi et al. | |
| 5,460,136 | 10/1995 | Yamazaki et al. | |
| 5,477,836 | 12/1995 | Hyodo et al. | |
| 5,479,904 | 1/1996 | Fujimori | 123/520 |
| 5,592,922 | 1/1997 | Denz | 123/520 |
| 5,623,911 | 4/1997 | Kiyomiya | 123/520 |

FOREIGN PATENT DOCUMENTS 0623348   2/1980   Japan ...................................... 123/520

*Primary Examiner*—Carl S. Miller
*Attorney, Agent, or Firm*—Neil P. Ferraro

[57] ABSTRACT

A fuel vapor recovery system for an automotive vehicle includes a fuel tank, a first vapor recovery canister, a second vapor recovery canister, and a bypass flow metering element. The first canister has an inlet communicating directly with the fuel tank and an outlet. The second canister has an inlet communicating directly with the outlet of the first canister. The bypass flow metering element is disposed between the inlet and outlet of the first canister and directs a predetermined portion of the vapor from the tank directly to the inlet of the second canister, thereby reducing the vapor flow restriction through the system.

6 Claims, 2 Drawing Sheets

FUEL VAPOR RECOVERY SYSTEM

FIELD OF THE INVENTION

The present invention relates to fuel vapor recovery systems in automotive vehicles, and, more particularly, to fuel vapor recovery systems having reduced flow restrictions.

BACKGROUND OF THE INVENTION

Vehicles are refueled by dispensing fuel from a filling nozzle at a filling station into a vehicle fuel tank. Because of fuel turbulence and air entrainment associated with filling the fuel tank, fuel vapor may be generated in the fuel tank. In addition, as the fuel in the fuel tank is consumed by the engine, a volume of space exists above the fuel level in the fuel tank. High temperature or sloshing of the fuel in the tank may create fuel vapor in the tank. It is desirable to manage this fuel vapor by the vehicle's on-board fuel vapor recovery system.

Due to capacity requirements, packaging, and commonization of components, conventional on-board fuel vapor recovery systems used in automotive vehicles often include multiple carbon canisters. Typically, the canisters are connected in a series arrangement such that the output flow from one canister feeds into the input of another. This ensures that the entire capacity of the canisters within the set is utilized and inhibits premature migration of hydrocarbons through the set.

The inventors of the present invention have discovered certain disadvantages with these systems. The series arrangement of canisters may cause a high restriction to flow. During refueling, this high flow restriction presents a problem. For example, as fuel is pumped into the fuel tank at rates of up to 10 gallons per minute, the vapor in the tank generated during the refueling process must flow out of the tank at an equally high rate. However, due to the relatively high flow restriction through the system, the filling nozzle, being sensitive to backpressure in the fuel tank, may prematurely shut off. Thus, an on-board vapor recovery system having a relatively low vapor flow restriction is desirable.

SUMMARY OF THE INVENTION

An object of the present invention is to provide a fuel vapor recovery system of a vehicle having a low flow restriction. This object is achieved and disadvantages of prior art approaches are overcome by providing a fuel vapor recovery system for an automotive vehicle having a fuel tank, a first vapor recovery canister, a second vapor recovery canister and a bypass flow metering element. The first canister has an inlet communicating directly with the fuel tank and an outlet. The second canister has an inlet communicating directly with the outlet of the first canister. The bypass flow metering element is disposed between the inlet and outlet of the first canister and directs a predetermined portion of the vapor from the tank directly to the inlet of the second canister, thereby reducing the restriction through the first canister.

In a preferred embodiment, the bypass flow element includes an orifice for metering the vapor flow through the canisters.

In another embodiment, the bypass flow element further comprises a check valve positioned to allow flow away from the fuel tank. The check valve may have a predetermined operating point such that at relatively low flow conditions, the check valve remains closed and vapor from the tank flows through both canisters in a series arrangement.

An advantage of the present invention is that a low cost, low maintenance fuel vapor recovery system is provided.

Another, more specific, advantage of the present invention is that all available vapor recovery canisters may be utilized.

Still another advantage of the present invention is that the potential for premature fuel fill pump shut off is reduced.

Yet another advantage of the present invention is that during low vapor flow and vapor purge conditions, flow is forced through both canisters in a series flow relation thereby utilizing all available carbon in the canisters and controlling or inhibiting premature hydrocarbon migration.

Other objects, features and advantages of the present invention will be readily appreciated by the reader of this specification.

BRIEF DESCRIPTION OF THE DRAWINGS

The invention will now be described, by way of example, with reference to the accompanying drawings, in which.

DETAILED DESCRIPTION OF THE PREFERRED EMBODIMENT

Figure 1:
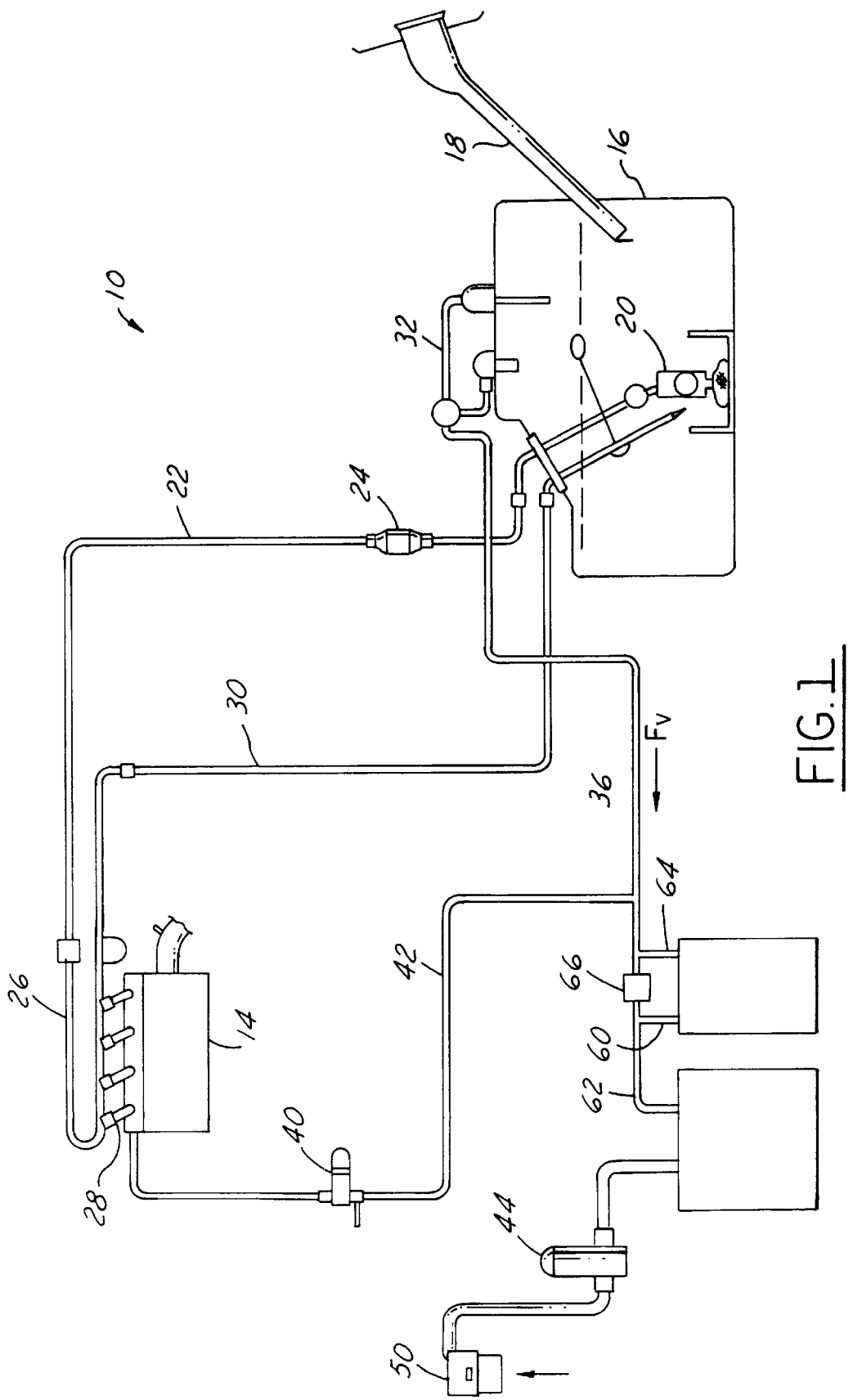
FIG. 1 is a schematic view of an automotive powerplant having a fuel vapor recovery system according to the present invention.

Fuel vapor recovery system 10, shown in FIG. 1, includes carbon canisters 12, 13 attached to both internal combustion engine 14 and fuel tank 16. As is well known to those skilled in the art, fuel enters fuel tank 16 through fuel filler tube 18 and is pumped to engine 14 by electric fuel pump 20 through fuel line 22 and fuel filter 24. Fuel is then distributed by fuel rail 26 to a plurality of fuel injectors 28. Excess fuel not utilized by engine 14 is returned to fuel tank 16 through fuel return line 30. Those skilled in the art will recognize in view of this disclosure that a returnless fuel system (having no return line 30) may be used as well.

Vent line 32 in fuel vapor recovery system 10 is used to vent fuel vapor from fuel tank 16. Fuel vapor exits fuel tank 16 through vent line 32 and is transported to carbon canisters 12, 13 through fuel vapor recovery line 36.

Carbon canisters 12, 13 contain activated carbon which is used to adsorb any fuel vapor entering therein. Periodically, the fuel vapor accumulated or adsorbed by the carbon in the carbon canisters must be purged so as to refresh the carbon canisters to enable them to adsorb additional vapor. Accordingly, this purged vapor is utilized by internal combustion engine 14. An engine controller (not shown) actuates canister purge valve 40 to allow vapor from carbon canisters 12, 13 to flow through vapor purge line 42. The engine controller then modifies the fuel delivery to fuel injectors 28 to accommodate the additional fuel source from the purged fuel vapor. In order to desorb the fuel vapor stored in carbon canisters 12, 13, air is introduced into carbon canisters 12, 13 through canister vent valve 44, which is actuated by the controller (not shown). Typically, air filter 50 is placed upstream of carbon canisters 12, 13 to introduce filtered air into carbon canisters 12, 13.

Canisters 12, 13 are connected in series in vapor recovery system 10 such that outlet 60 of canister 12 communicates with inlet 62 of canister 13. Accordingly, fuel vapor, $F_v$, flows from tank 16, through vapor recovery line 36, into inlet 64 of canister 12 and is adsorbed therein. Any remaining fuel vapor is then adsorbed by canister 13. According to the present invention, bypass element or controller 66 is disposed between inlet 64 and outlet 60 of canister 12 so that a predetermined amount of fuel vapor may bypass canister 12 and flow directly into canister 13. The bypassed vapor flow then combines with any excess vapor flowing out of canister 12 and together enters canister 13. This has the effect of reducing the flow restriction through canister 12 and subsequently though system 10.

Figure 2:
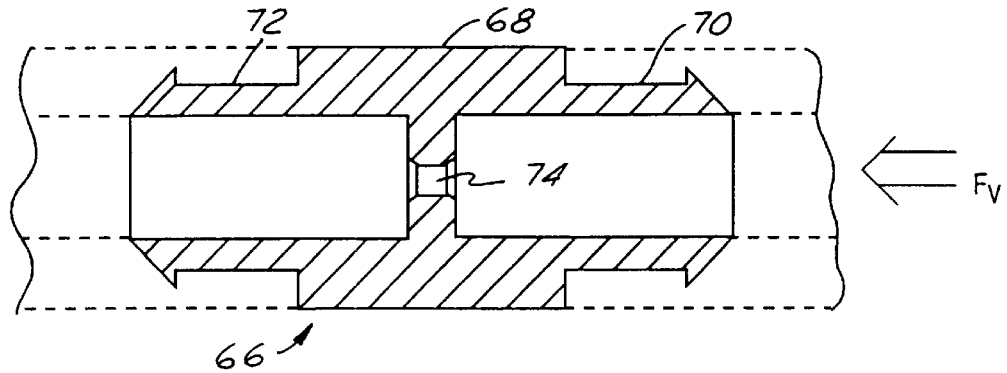
FIG. 2 is a cross sectional view of a bypass element of the fuel vapor recovery system according to the present invention.

Turning now to FIG. 2, bypass element 66 is shown. Bypass element 66 includes housing 68, with inlet 70 and outlet 72. Inlet 70 is connected to vapor recovery line 36 and inlet 64 of canister 12 whereas outlet 72 is connected to outlet 60 of canister 12 and inlet 62 of canister 13 (see FIG. 1). Bypass element also includes orifice 74 integrally formed within housing 68 for metering the fuel vapor flow $F_v$ therethrough. Of course, those skilled in the art will recognize in view of this disclosure that orifice 74 may be a separate element inserted into housing 68. In addition, housing 68 may also include canister lines 60, 64 formed therein. Orifice 74 is sized such that each canister 12, 13 fills with vapor at substantially the same rate. In a preferred embodiment, orifice 74 is sized such that canister 12 fills with vapor at a relatively faster rate than canister 13. That is, canister 12 fills just slightly ahead of canister 13. This ensures that maximum system capacity is obtained.

Figure 3:
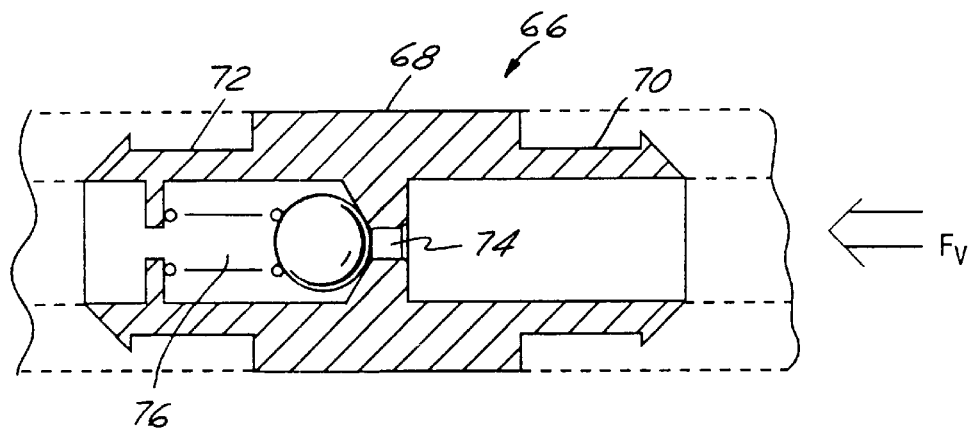
FIG. 3 is a cross sectional view of an alternative bypass element of the fuel vapor recovery system according to the present invention; and, FIG. 4 is a graph of fuel tank vapor pressure versus tank fill time according to the present invention.

In an alternative embodiment, as shown in FIG. 3, bypass element 66 includes check valve 76 positioned to allow vapor flow $F_v$ away from tank 16 and toward canister 13 (FIG. 1). The function of check valve 76 is two-fold. First, the check valve prevents backflow through bypass element 66 during purging of canisters 12, 13 thereby forcing the purging air through both canisters 12, 13 in a series arrangement. This ensures full desorption of fuel vapor from canisters 12, 13, especially when the canisters have been filled in series, as will be explained next. Second, check valve 76 has a predetermined operating point that prevents bypass flow of fuel vapor $F_v$ until the vapor pressure tank 16 has reached a predetermined level. Thus, at relatively high flow and pressure conditions (i.e. during refueling), a portion of the fuel vapor bypasses canister 12 and flows directly into canister 13 as previously described. At relatively low flow and pressure conditions (i.e. during normal vapor recovery conditions), the check valve remains closed, thereby forcing the vapor flow $F_v$ through each canister 12, 13 in a series flow arrangement. This is tolerated and in fact desirable because fuel vapor migration through canisters 12, 13 is delayed.

Figure 4:
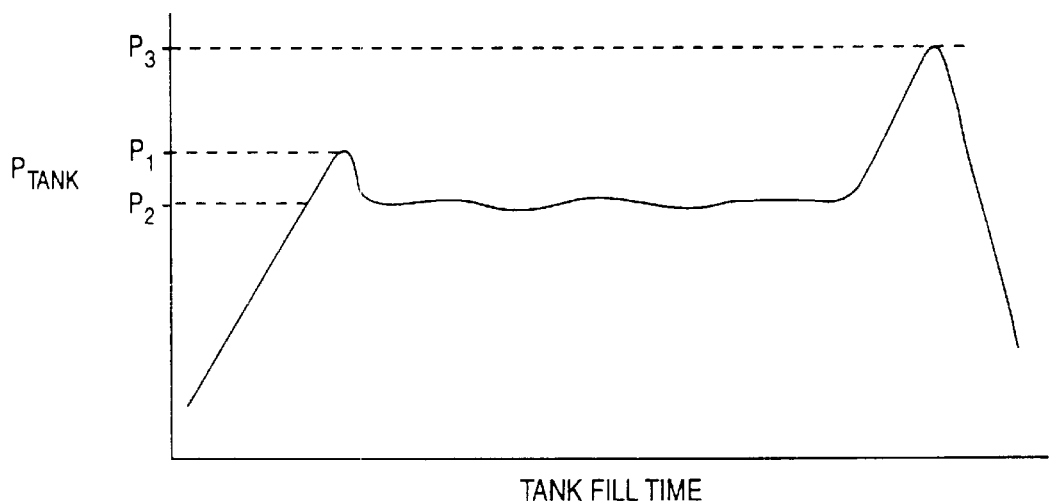

Referring now to FIG. 4, a graph of fuel tank pressure versus fuel tank fill time is shown. As tank 16 is being filled with fuel, the fuel vapor pressure increases to a pressure level shown as $P_1$. The vapor pressure in tank 16 then stabilizes to a level shown as $P_2$. As the fuel level rises, if tank 16 was sealed, the vapor pressure would continue to rise. However, because tank 16 is vented such that the vapor flows into fuel vapor recovery system 10, the vapor pressure in tank 16 is set by the flow restriction through vapor recovery system 10 and the fuel fill rate. Thus, if the flow restriction through vapor recovery system 10 approached the filler nozzle shut off pressure level, shown as $P_3$, then the fuel filler nozzle may prematurely shut off prior to tank 16 being filled with fuel. According to the present invention, bypass flow element 66 reduces the system flow restriction, which is especially necessary during refueling to reduce the possibility of premature fuel filler nozzle shut off.

While the best mode for carrying out the invention has been described in detail, those skilled in the art in which this invention relates will recognize various alternative designs and embodiments, including those mentioned above, in practicing the invention that has been defined by the following claims.

We claim:

1. A fuel vapor recovery system for an automotive vehicle comprising:

a fuel tank;

a first vapor recovery canister having an inlet communicating directly with said fuel tank and an outlet;

a second vapor recovery canister having an inlet communicating directly with said outlet of said first vapor recovery canister; and, a bypass flow metering element connected directly between said inlet and outlet of said first vapor recovery canister for directing a predetermined portion of the vapor from said tank directly to said inlet of said second vapor recovery canister, thereby reducing the restriction through said first vapor recovery canister, with purge air, upon purging said canisters, flowing though said second canister to initially purge said second canister and entering said first canister exclusively from said second canister to then purge said first canister.

2. A system according to claim 1 wherein said bypass flow element meters vapor flow through said system such that each said canister fills with vapor at substantially the same rate.

3. A system according to claim 1 wherein said bypass flow element meters said vapor flow through said system such that one of said canisters fills with vapor at a relatively faster rate than the other said canister.

4. A system according to claim 1 wherein said bypass flow metering element comprises an orifice.

5. A system according to claim 4 wherein said bypass flow metering element further comprises a check valve positioned to allow flow toward said second vapor recovery canister.

6. A system according to claim 5 wherein said check valve has a predetermined operating point such that at relatively low flow conditions, said check valve remains closed and vapor from said tank flows through both said canisters in a series arrangement.

* * * * *